United States Patent
Gray et al.

[11] Patent Number: 6,158,795
[45] Date of Patent: Dec. 12, 2000

[54] MECHANIZED FLOOR CONSOLE

[75] Inventors: John D. Gray, Union, N.H.; Scott J. Duletzke, Clinton Township, Mich.

[73] Assignee: Textron Automotive Company, Inc., Troy, Mich.

[21] Appl. No.: 09/116,413

[22] Filed: Jul. 16, 1998

Related U.S. Application Data

[63] Continuation-in-part of application No. 08/707,527, Sep. 4, 1996, Pat. No. 5,823,599.
[60] Provisional application No. 60/003,302, Sep. 6, 1995.

[51] Int. Cl.[7] ................................................. B60R 11/02
[52] U.S. Cl. ........................................... 296/37.8; 224/929
[58] Field of Search ............................... 296/37.8, 37.12, 296/37.7; 224/539, 282, 929

[56] References Cited

U.S. PATENT DOCUMENTS

| | | |
|---|---|---|
| 1,295,232 | 2/1919 | Stewart . |
| 2,047,516 | 7/1936 | Lutsche . |
| 3,926,473 | 12/1975 | Hogan . |
| 4,818,008 | 4/1989 | Cressoni . |
| 4,848,627 | 7/1989 | Maeda et al. . |
| 4,877,287 | 10/1989 | Escaravage . |
| 4,878,438 | 11/1989 | Carver . |
| 4,934,750 | 6/1990 | Eichler et al. . |
| 4,940,275 | 7/1990 | Miki et al. . |
| 4,998,770 | 3/1991 | Shimizu et al. . |
| 5,085,481 | 2/1992 | Fluharty et al. . |
| 5,102,181 | 4/1992 | Pinkney ............................... 296/37.12 |
| 5,104,186 | 4/1992 | Kwasnik et al. . |
| 5,106,143 | 4/1992 | Soeters . |
| 5,112,094 | 5/1992 | Kribs . |
| 5,131,716 | 7/1992 | Kwasnik et al. . |
| 5,188,423 | 2/1993 | Meiller et al. . |
| 5,388,081 | 2/1995 | Young et al. . |
| 5,397,160 | 3/1995 | Landry . |
| 5,609,382 | 3/1997 | Schmid et al. ........................ 296/37.8 |
| 5,678,875 | 10/1997 | Zipperle et al. ..................... 296/37.8 |

FOREIGN PATENT DOCUMENTS

| | | |
|---|---|---|
| 361077542A | 4/1986 | Japan . |
| 405193420A | 8/1993 | Japan . |

*Primary Examiner*—Joseph D. Pape
*Attorney, Agent, or Firm*—Hayes, Soloway, Hennessey, Grossman & Hage, P.C.

[57] ABSTRACT

A vehicle passenger compartment console assembly including a console body having an outer shell and an access opening disposed in the console body outer shell. A positioning apparatus is movably supported within the console body outer shell. At least two storage modules are disposed within the shell and are movably supported on the positioning apparatus. The storage modules are sequentially movable between one or more concealed positions displaced from the access opening and a displayed position adjacent the access opening. The positioning apparatus is configured to support any one of the storage modules in the display position while simultaneously supporting at least one of the other storage modules in a concealed position. This arrangement allows passenger compartment occupants to gain physical access to a module and its contents through the access opening while leaving other modules concealed within the shell.

10 Claims, 7 Drawing Sheets

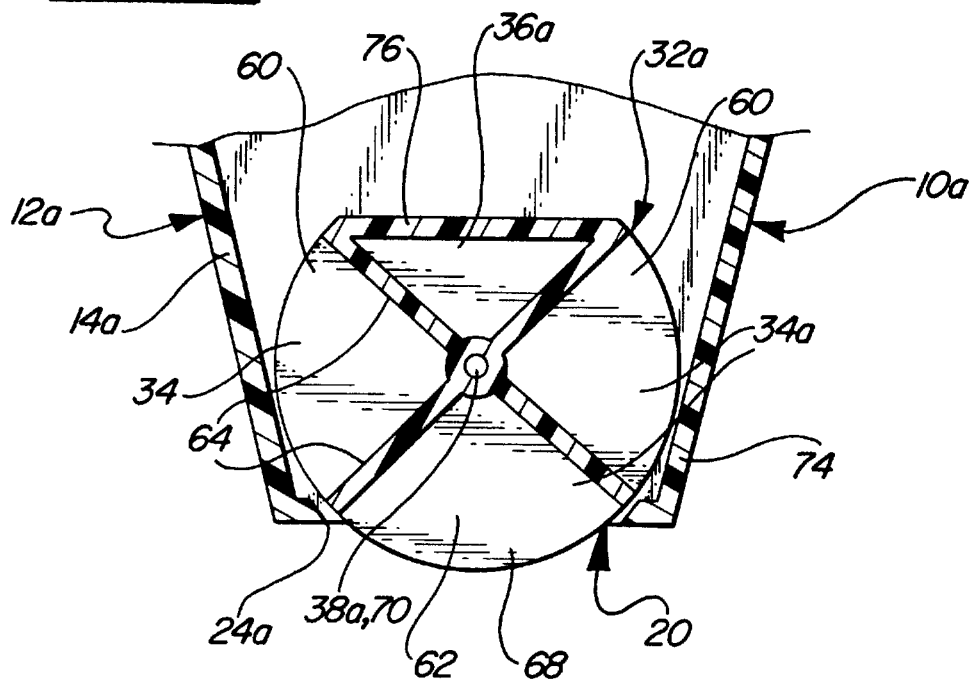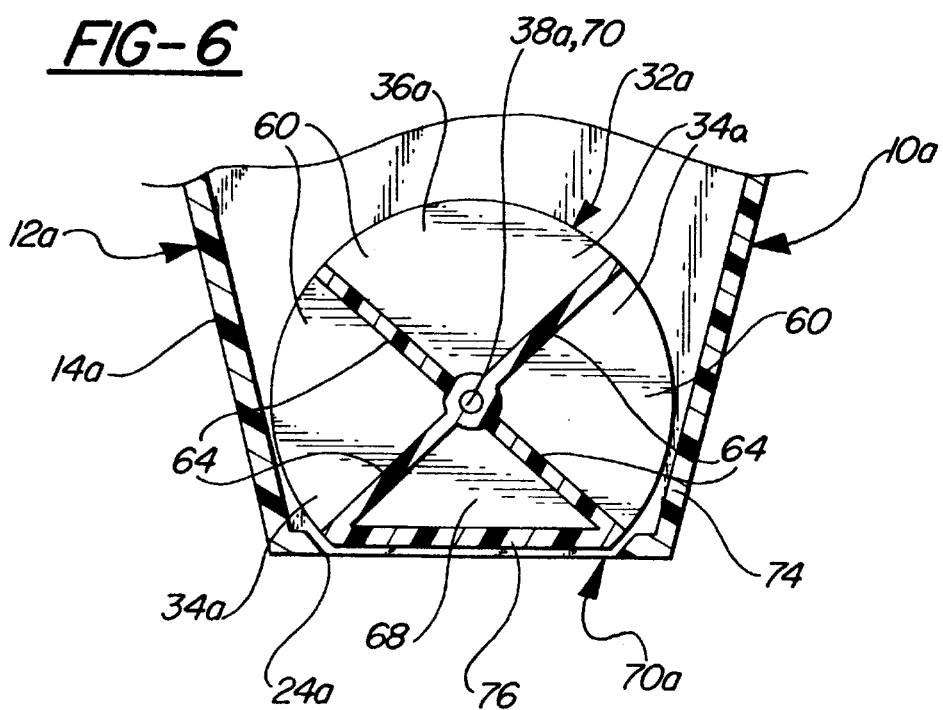

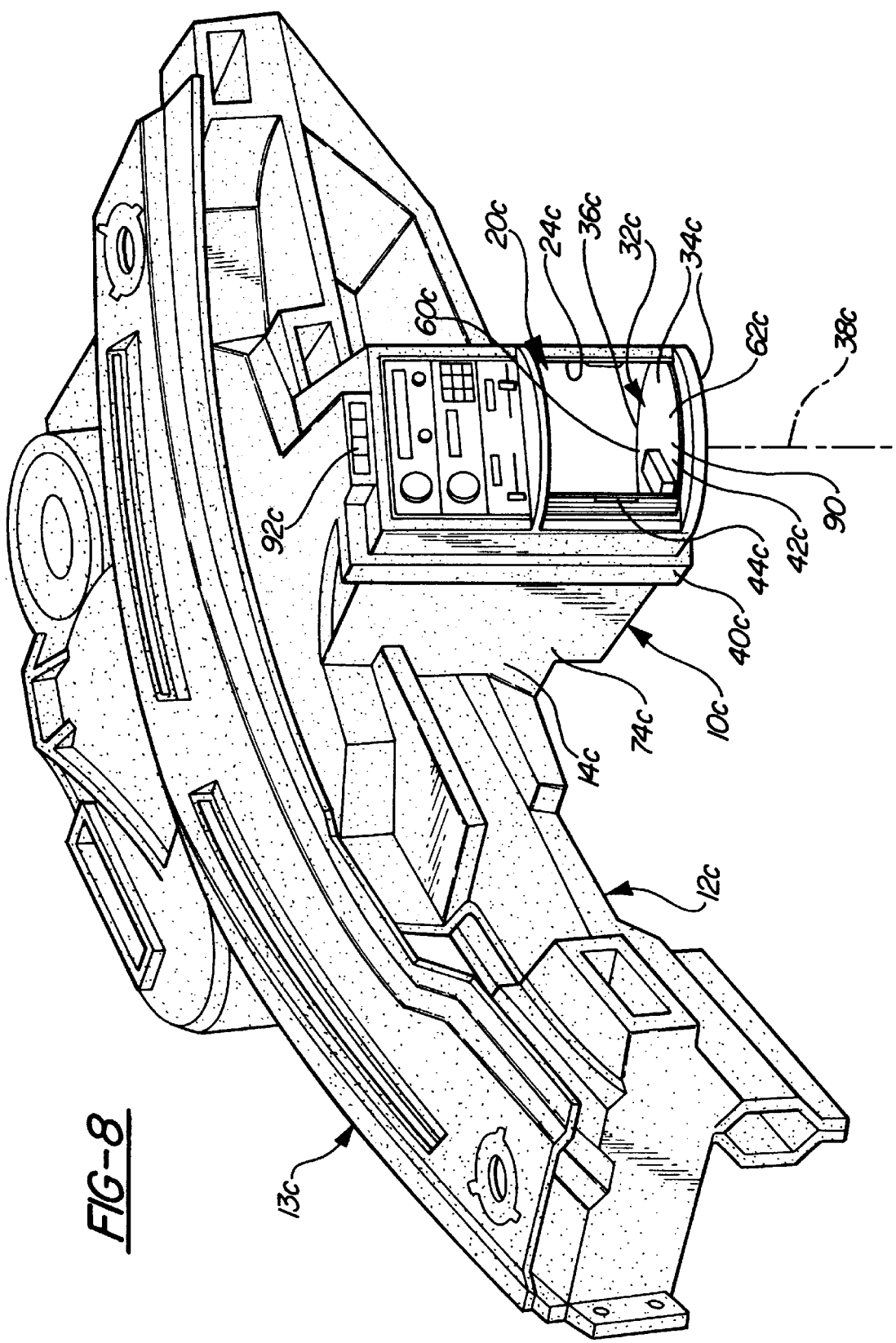

MECHANIZED FLOOR CONSOLE

This application is a continuation-in-part of U.S. patent application Ser. No. 08/707,527, filed Sep. 4, 1996, now U.S. Pat. No. 5,823,599, entitled MECHANIZED FLOOR CONSOLE, and U.S. Provisional Application Ser. No. 60/003,302, filed Sep. 6, 1995, entitled MECHANIZED CONSOLE/CONSOLE CARROUSEL.

TECHNICAL FIELD

This invention relates generally to a console for a motor vehicle and, more particularly, to a console having interchangeable storage modules.

BACKGROUND OF THE INVENTION

It is desirable for motor vehicle consoles to include storage compartments for storing loose items and receptacles for housing accessories such as radios, tape decks, CD players, citizens' band radios, and the like. Including such items and accessories within a floor or instrument panel console allows vehicle occupants to easily see and reach the items and accessories while the vehicle is underway.

Current consoles include fixed storage compartments for loose items and permanent receptacles and mounting systems for various accessories. For example, U.S. Pat. No. 5,106,143 issued Apr. 21, 1992 to Soeters discloses an automotive floor console including a main body 20 with storage compartments 27, 28. The storage compartments 27, 28 are fixed within the console main body 20. The Soeters floor console includes no provision for allowing occupants to interchange storage modules.

U.S. Pat. No. 3,926,473 issued Dec. 16, 1975 to Hogan discloses an adjustable center armrest unit with "wings" 7 that adjust laterally outward from a main body portion 1 revealing a fixed, non-removable storage compartment 27. As with the Soeters console, and other consoles in the prior art of record, the Hogan console does not provide for the interchange of storage or accessory modules.

What is needed is a console system that allows occupants to select various interchangeable storage and accessory modules that the occupants can then have access to while the vehicle is under way.

SUMMARY OF THE INVENTION

In accordance with this invention a motor vehicle console assembly is provided that includes positioning apparatus configured to support any one of at least two storage modules in a display position while simultaneously supporting at least one of the other storage modules in a concealed position. This allows a passenger compartment occupant to gain physical access to a module and its contents through the access opening while leaving other modules concealed within the shell. The assembly also includes a console body having an outer shell and an access opening disposed in the console body outer shell. A positioning apparatus is movably supported within the console body outer shell. The storage modules are disposed within the shell and are movably supported on the positioning apparatus. The storage modules are sequentially movable between one or more concealed positions displaced from the access opening and a displayed position adjacent the access opening.

According to another aspect of the invention, the positioning apparatus comprises an electro-mechanical occupant-actuated drive mechanism. The drive mechanism relieves occupants of the need to physically move the storage modules between the concealed positions and the displayed position.

According to another aspect of the invention, the positioning apparatus comprises an occupant-actuated automatic module selection system. The automatic selection system allows occupants to move a selected storage module to the displayed position by actuating the automatic system and designating which storage module they wish to have displayed.

According to another aspect of the invention, the modules are sequentially moveable through the displayed position.

According to another aspect of the invention, the positioning apparatus comprises a carrousel supported for rotation about a carrousel axis.

According to another aspect of the invention, the positioning apparatus comprises a drum-type carrousel supported for rotation about a generally horizontal axis. This horizontal axis disposition provides a configuration that better accommodates the storage and selective display of certain vehicle accessories According to another aspect of the invention, an access door is movably supported across the module access opening. The door is shaped to cover the access opening in a closed position and movable to an open position uncovering the access opening.

According to another aspect of the invention, at least one of the modules comprises an appliance that is incorporated into the design of the module. This gives occupants selective access to any number of different appliances that are so incorporated.

According to another aspect of the invention, at least one of the modules comprises a storage space. This allows occupants to store loose items in selectively accessible modules of the console assembly.

According to another aspect of the invention the console body is a floor console body supported on a floor of an automobile between a front driver's seat and a front passenger seat of the automobile. Positioning the console assembly in a floor console provides ready access to storage modules for passenger compartment occupants.

According to another aspect of the invention, a forward image display panel is supported in a forward end of the console body. This display panel is supported in a position to provide information to front seat occupants.

According to another aspect of the invention, an aft image display panel is supported in an aft end of the console body and image-producing electronic circuitry connected to the aft display panel. This display panel is supported in a position to provide information to rear seat occupants.

According to another aspect of the invention at least one remote-control unit is included that is communicable with the electronic image-producing circuitry. The remote-control unit allows occupants to control information displayed on the display panel without having to reach forward and manipulate controls on the floor console.

According to another aspect of the invention the console body is an instrument panel console body supported in an instrument panel assembly of the automobile. Locating the assembly in the instrument panel console body provides occupants with easy forward access to items stored or mounted in the assembly.

According to another aspect of the invention, the positioning apparatus comprises a drum-type carrousel supported in the instrument panel console body for rotation about a generally vertical axis.

According to another aspect of the invention, the positioning apparatus comprises a drum-type carrousel supported in the instrument panel console body for rotation about a generally horizontal axis.

According to another aspect of the invention, the carrousel is at least partially housed within a central stack portion of the instrument panel assembly.

According to another aspect of the invention, the carrousel is rotatable to a closed position and in which the carrousel includes a face panel that covers the access opening in the closed position. The face panel deters theft by denying physical access to the contents of the storage modules in the closed position.

According to another aspect of the invention, the positioning apparatus includes a platform having at least two storage regions. The platform is rotatably supported within the console body outer shell. The positioning apparatus is configured to rotate the platform and move a selected one of the storage regions to a display position adjacent the access opening while simultaneously moving the other of the storage regions into a remote position displaced from the access opening. This allows a passenger compartment occupant to gain physical access to an item stored on one storage region of the platform through the access opening while leaving other items stored on the other storage regions in the remote positions within the shell.

BRIEF DESCRIPTION OF THE DRAWINGS

To better understand and appreciate the invention, refer to the following detailed description in connection with the accompanying drawings:

FIG. 5 is a partial cross-sectional view of the instrument panel assembly of FIG. 3 taken along line 5—5 of FIG. 3;

FIG. 6 is a partial cross-sectional view of the instrument panel assembly of FIG. 4 taken along line 6—6 of FIG. 4;

FIG. 8 is a perspective view of an instrument panel assembly constructed according to a fourth embodiment of the invention.

DETAILED DESCRIPTION OF THE PREFERRED EMBODIMENT

Figure 1:
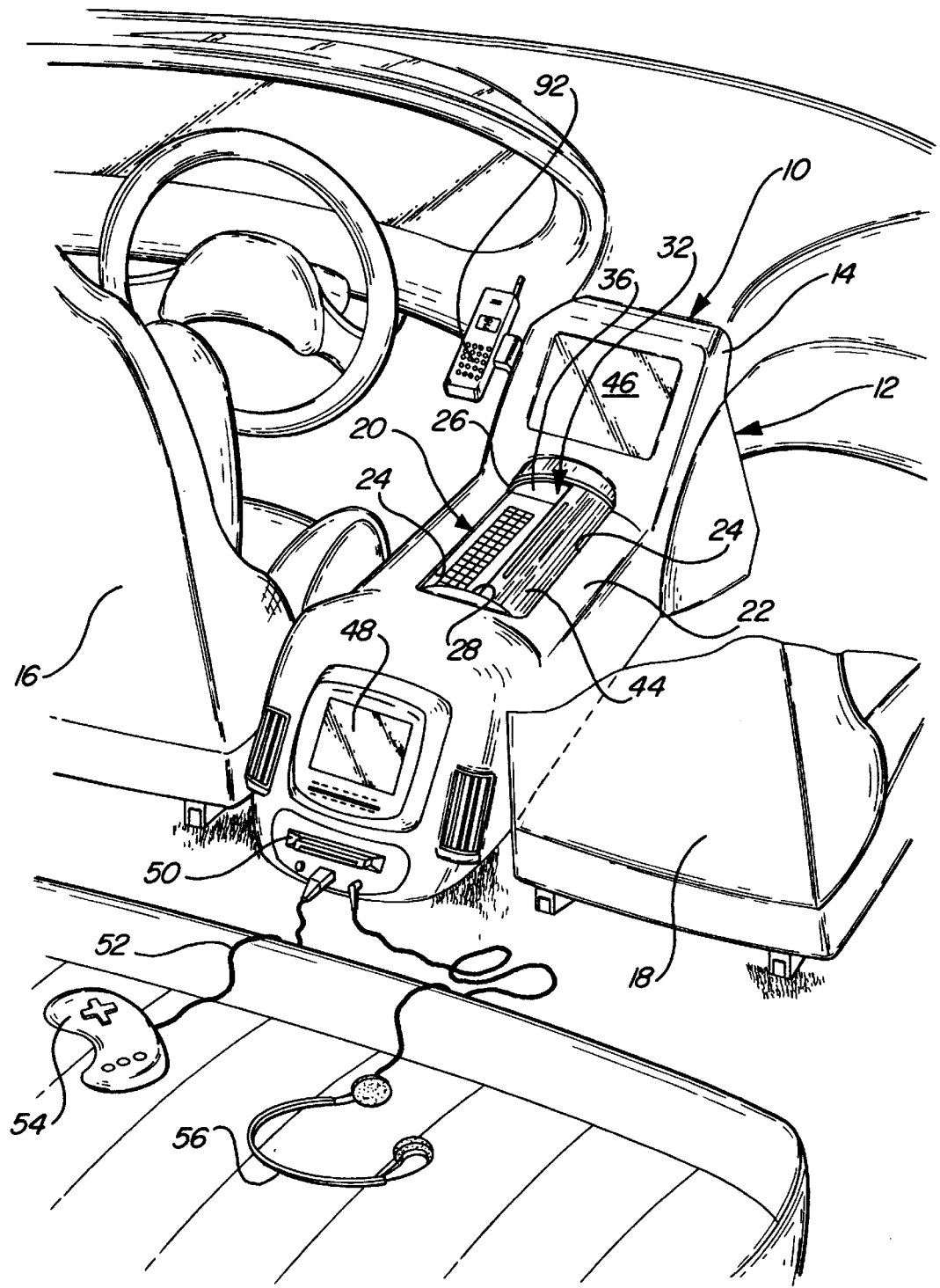
FIG. 1 is a perspective view of a floor console assembly constructed according to a first embodiment of the present invention and installed in a vehicle interior.
Figure 2:
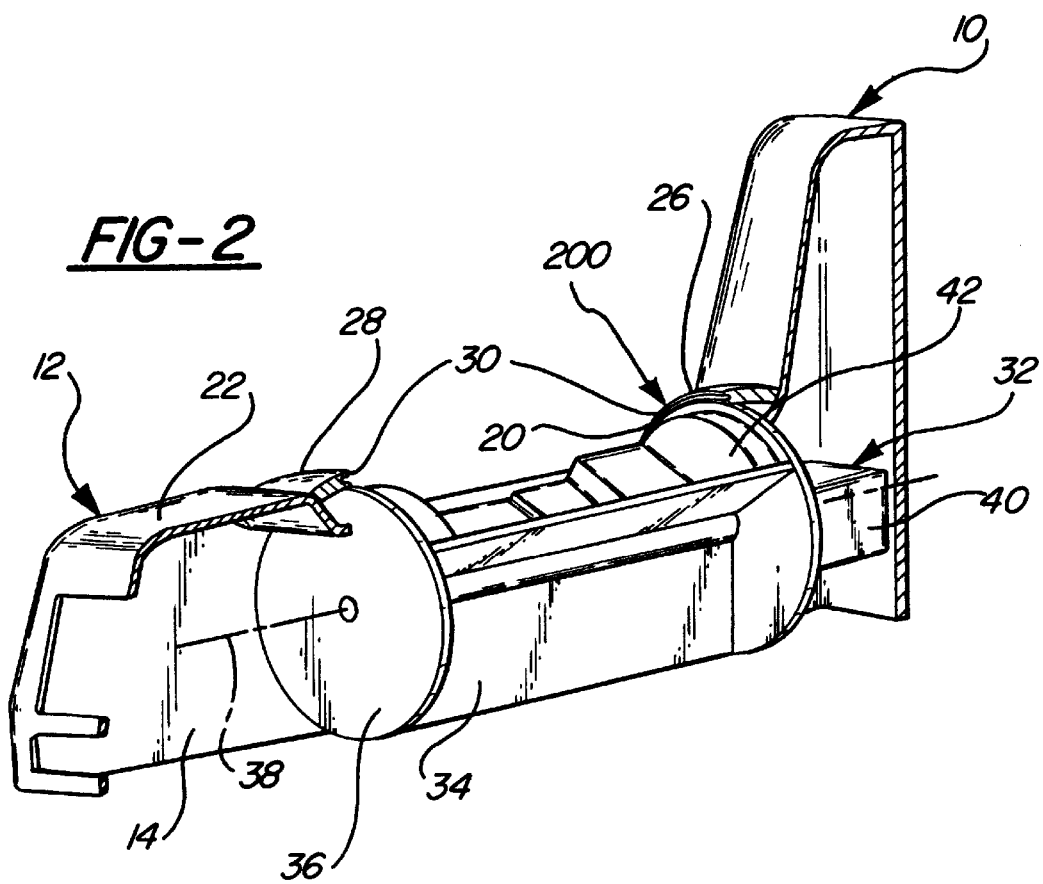
FIG. 2 is a cut-away perspective view of the floor console assembly of FIG. 1.
Figure 3:
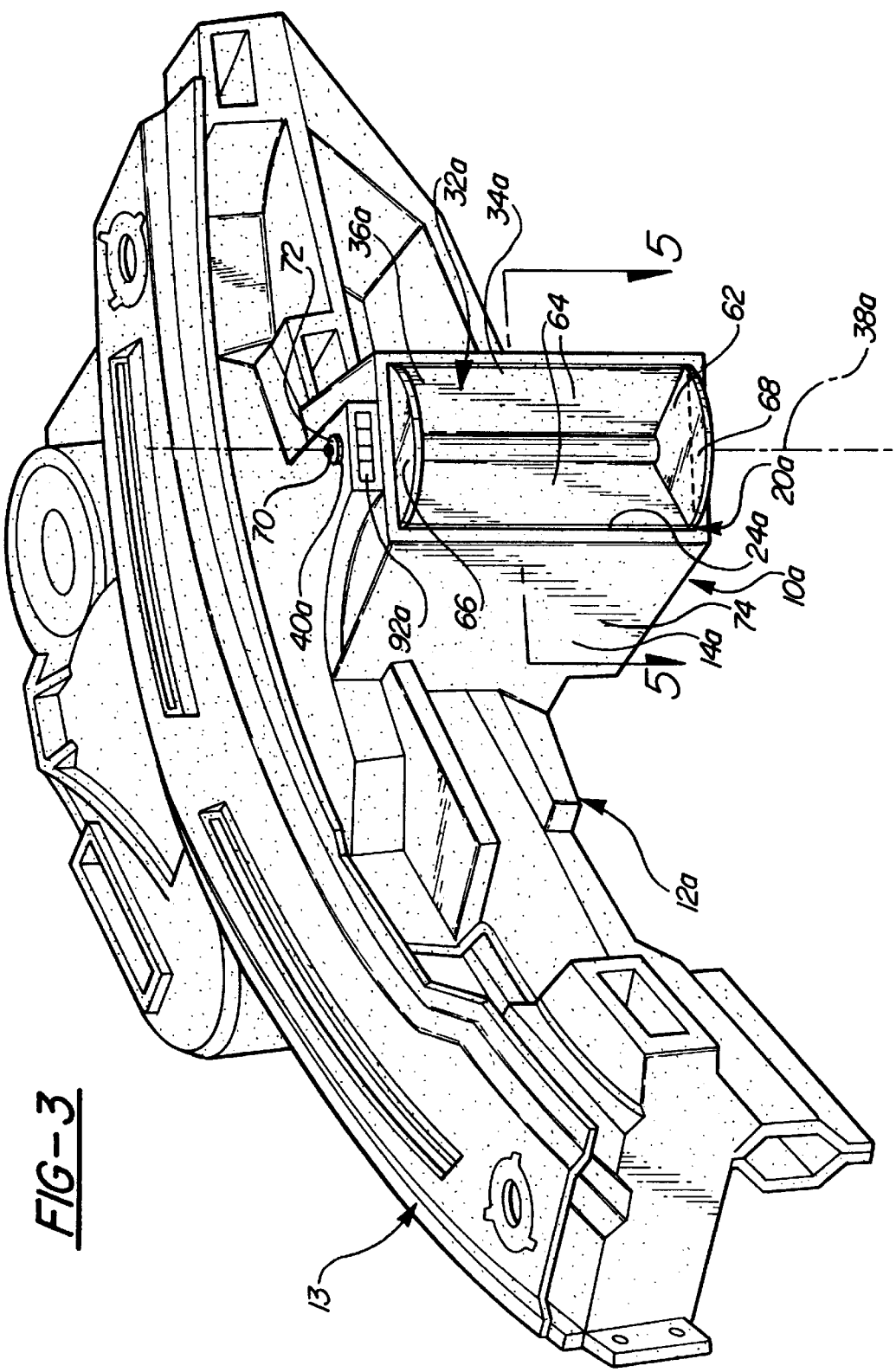
FIG. 3 is a perspective view of an instrument panel assembly constructed according to a second embodiment of the present invention with a carrousel portion of the assembly in an open position.

A first embodiment of a vehicle passenger compartment console assembly constructed according to the present invention is shown at 10 in FIGS. 1 and 2. Alternative embodiments of the console assembly are generally shown at 10a in FIGS. 3–6 and 10b and 10c in FIGS. 7 and 8, respectively. Reference numerals with the suffix "a" in FIGS. 3–6, the suffix "b" in FIG. 7 and the suffix "c" in FIG. 8 designate the alternative configuration of each element common to the embodiment of FIGS. 1 and 2. Unless the description indicates otherwise, where the description uses a reference numeral to refer to an element in FIGS. 1 or 2, I intend that portion of the description to apply equally to elements in FIGS. 3–6 indicated by the same reference numeral with the suffix "a", the elements in FIG. 7 indicated by the same reference numeral with the suffix "b", and the elements in FIG. 8 indicated by the same reference numeral with the suffix "c."

The floor console assembly 10 includes a console body 12 with an outer shell 14 having a size and shape that allow the console assembly 10 to fit in the area between the front driver seat 16 and the front passenger seat 18 of a motor vehicle. As shown in FIG. 1, the outer shell 14 has an elongated box shape with rounded corners and edges sculpted to flow into the interior contours of the automobile the console is installed in.

The first embodiment of the floor console assembly 10 includes an access opening 20 disposed in the console body outer shell 14. The access opening 20 is centrally located in an upper surface 22 of the outer shell 14 and is generally rectangular. The access opening 20 is defined by a pair of straight side edges 24 and by upwardly curved forward 26 and aft 28 edges. The forward 26 and aft 28 edges each include a semi-circular groove 30.

As is best shown in FIG. 2, the first embodiment also includes a module positioning apparatus 32 that is movably supported within the console body outer shell 14. The positioning apparatus 32 comprises a drum-type carrousel 36 supported for rotation about a horizontal central carrousel axis 38. The carrousel axis 38 is aligned parallel to the direction that the immediately adjacent passenger seats 16, 18 are facing, i.e., the direction of vehicle travel.

As shown in FIG. 2, the positioning apparatus 32 may include an electro-mechanical occupant-actuated drive mechanism 40 and may also include an occupant-actuated automatic module selection system 92. To select a module using the electro-mechanical drive mechanism 40 an occupant actuates the drive mechanism and causes it to continue rotating modules past the access opening until a desired module appears in the access opening 20. With the automatic selection system, an occupant momentarily depresses a button or key corresponding to the desired module which causes the drive mechanism 40 to rotate the carrousel until the selected module appears.

Three storage modules 34 and/or appliance modules 42 are supported on the positioning apparatus 32 for rotational movement within the console body outer shell 14. In other embodiments the positioning apparatus may carry only two modules or may carry more than three modules. Other embodiments may also move the modules in other than a rotational motion.

The shape of each storage module is a cylindrical section approximating an elongated triangular prism with a single elongated arcuate plane as shown at 34 in FIG. 2. Other embodiments may include modules having different sizes and shapes. Storage modules 34 may also include contoured inserts designed to nest one or more loose articles.

An appliance module 42 may have any shape so long as that shape allows the appliance module 42 to fit within the confines of its assigned space within the carrousel 36. In the case of a carrousel with three equal-size compartments or sections, as shown in FIG. 2, the appliance module 42 must fit within a space approximating that defined by storage module 34. However, the module compartments or sections need not have the same size and shape. Some modules are larger than others to accommodate larger appliances. Examples of the types of appliances that may be built into the appliance modules 42 include computers, fax machines, modems, cellular telephones and hair-driers.

The storage 34 and appliance 42 modules are sequentially rotatable through a displayed position adjacent the access opening 20. The displayed position is best shown in FIG. 2 as viewed through the access opening 20. The carrousel-type positioning apparatus 32 allows passenger compartment occupants to select and retrieve any one of the storage 34 or appliance 42 modules and to gain access to its contents through the access opening 20.

As shown in FIG. 1, an access door 44 is slidably supported in the semi-circular grooves 30. The access door 44 has an arcuate shape to cover the access opening 20 in a closed position and may be slid to an open position revealing and providing access to the contents of whichever module 34, 42 is in the presented position.

A forward image display panel 46 in the form of a cathode ray tube (CRT) is supported in a forward end of the console body 12. The forward image display panel 46 is positioned to display images primarily to the occupants of seats 16, 18 positioned on either side of the console assembly 10.

An aft image display panel 48, also in the form of a CRT, is supported in an aft end of the console body 12. The aft image display panel 48 is positioned to display images primarily to occupants seated behind the console assembly 10. Image-producing electronic circuitry is included in an electronic computer game module 50 connected to the aft display panel 48 and, in response to occupant inputs, transmits signals that produce images on the aft display panel 48. In other embodiments, the image-producing electronic circuitry may not be included in a computer game module. Instead, it may be included in a device that, for example, converts broadcast microwave signals or information stored in magnetic media (videotape) into video images.

Occupant inputs to the electronic circuitry are passed through signal wires 52 from a remote-control unit 54. Audio signals may be transmitted to occupants via headphones 56. Alternatively, occupant inputs may be passed from the remote control unit 54 to the image-producing electronic circuitry by electromagnetic transmissions instead of wires.

This first embodiment 10 of the present invention reduces clutter by providing occupants with selective access to any one of a number of different storage 34 and appliance 42 modules and storing non-selected modules inside the center console 12. The electro-mechanical drive mechanism 40 and occupant-actuated automatic module selection system allow a driver to gain access to a module while diverting a minimum amount of attention from the task of operating the vehicle. The image display panels 46, 48 are conveniently located to display information to front and rear seat occupants, respectively.

The second embodiment of the vehicle passenger compartment console assembly is shown at 10a in FIGS. 3–6. The assembly 10a includes an instrument panel console body 12a rather than a center console body 12 as in the first embodiment. The instrument panel console body 12a is supported in an instrument panel assembly 13 of the automobile. The instrument panel assembly 13 may be of any type known in the art to include the panel disclosed in U.S. Pat. No. 5,556,153 (the '153 patent). The '153 patent is assigned to the assignee of the present invention and is incorporated herein by reference.

The instrument panel console body 12a includes an outer shell 14a. An access opening 20a is disposed in the outer shell 14a and a positioning apparatus 32a is movably supported within the outer shell 14a. Three storage modules 34a are also disposed within the shell 14a and are movably supported on the positioning apparatus 32a. The storage modules 34a are sequentially movable between one or more concealed positions and displaced from the access opening 20a and a displayed position adjacent the access opening 20a. The concealed positions are shown at 60 in FIGS. 5 and 6. The diplayed position is shown at 62 in FIGS. 3 and 5.

The positioning apparatus 32a is configured to support any one of the storage modules 34a in the display position 62 while simultaneously supporting the other two storage modules 34a in a concealed position 60. As with the first embodiment, this allows a passenger compartment occupant to gain physical access to a module 34a and its contents through the access opening 20a while leaving other modules 34a concealed within the shell 14a.

The positioning apparatus 32a comprises a drum-type carrousel 36a or turnstile supported in the instrument panel console body 12a for rotation about a generally vertical carrousel axis 38a. The storage modules 34a are defined by four vertically oriented rectangular divider panels shown at 64 in FIGS. 3, 5 and 6, a semi-circular cap panel shown at 66 in FIG. 3 and a base panel shown at 68 in FIGS. 3, 5 and 6. The base panel 68 generally matches the shape of the cap panel 66. The divider panels 64 extend radially and integrally outward from a common point at the vertical axis 38a. Upper and lower ends of the divider panels are connected to or integrally formed with the cap panel 66 and the base panel 68, respectively.

Other embodiments may include any suitable divider and cap panel configuration. As with the first embodiment, the carrousel 36a of the second embodiment may also incorporate appliance modules 34a and/or contoured inserts designed to nest one or more loose articles.

Rotational support may be supplied by any means known in the art to include axle rods 70 extending along the vertical axis 38a upward from the cap panel 66 and downward from the base panel 68 through or into journal bearing assemblies 72. The carrousel 36a may be molded as a single piece from plastic or other suitable materials, or the panels 64, 66, 68 may be connected together by adhesives, fasteners or any other means known in the art.

The carrousel 36a is at least partially housed within a central stack portion 74 of the instrument panel console body 12. The central stack portion 74 is described in detail in the '153 patent. The access opening 20a is defined by a rectangular opening in an aft end of the central stack portion 74.

Figure 4:
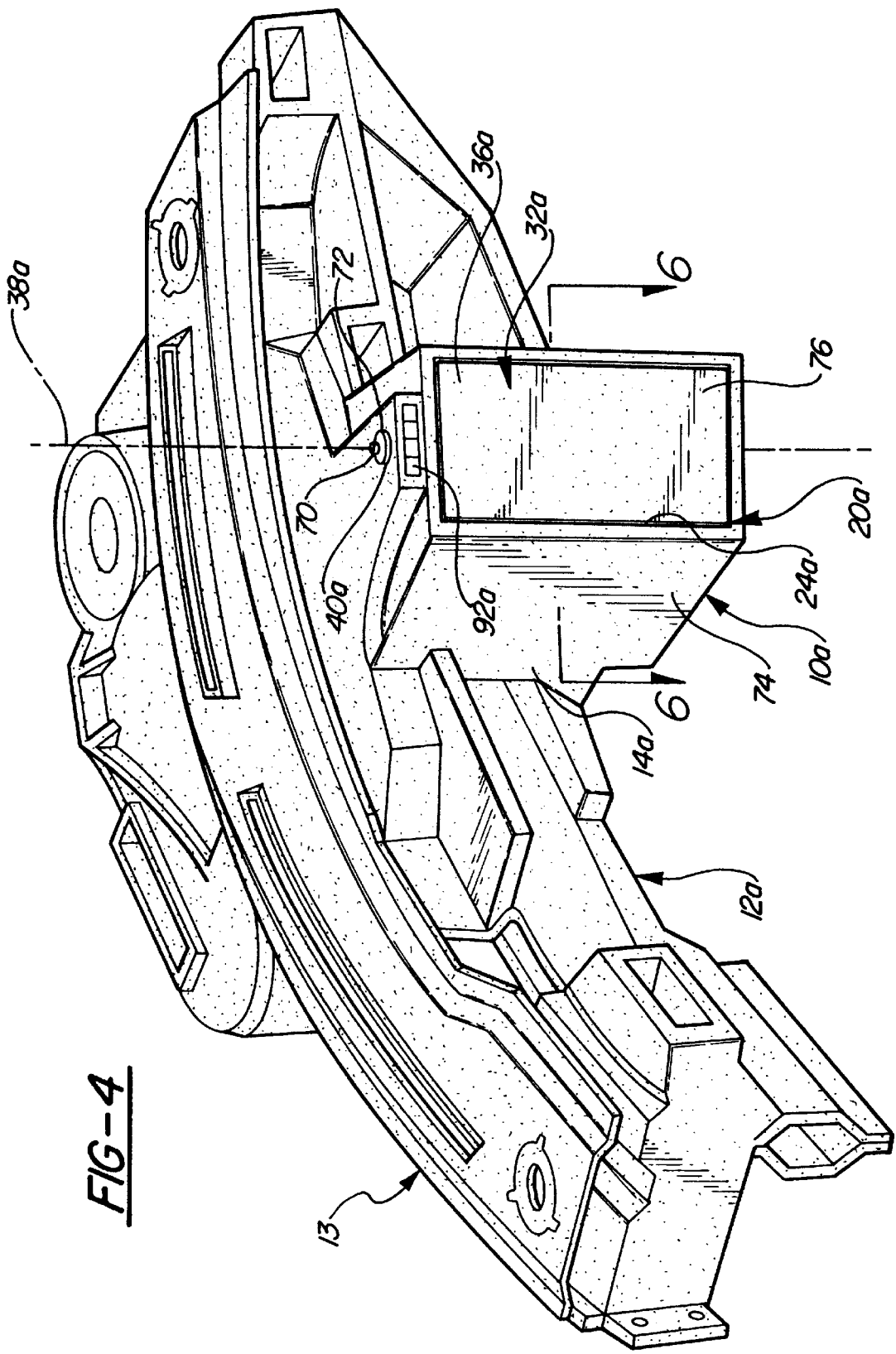
FIG. 4 is a perspective view of the instrument panel assembly of FIG. 3 with the carrousel portion of the assembly in a closed position.

The carrousel 36a is rotatable to a closed position as shown in FIG. 4. The carrousel 36a includes a flat, generally vertical face panel shown at 76 in FIGS. 4–6. The face panel 76 has the same approximate rectangular shape as the opening in the central stack portion 74 of the instrument panel console body 12 that defines the access opening 20. The face panel 76 is disposed across and generally closes the access opening 20, i.e., the rectangular opening, when the carrousel 36a is in the closed position.

Figure 7:
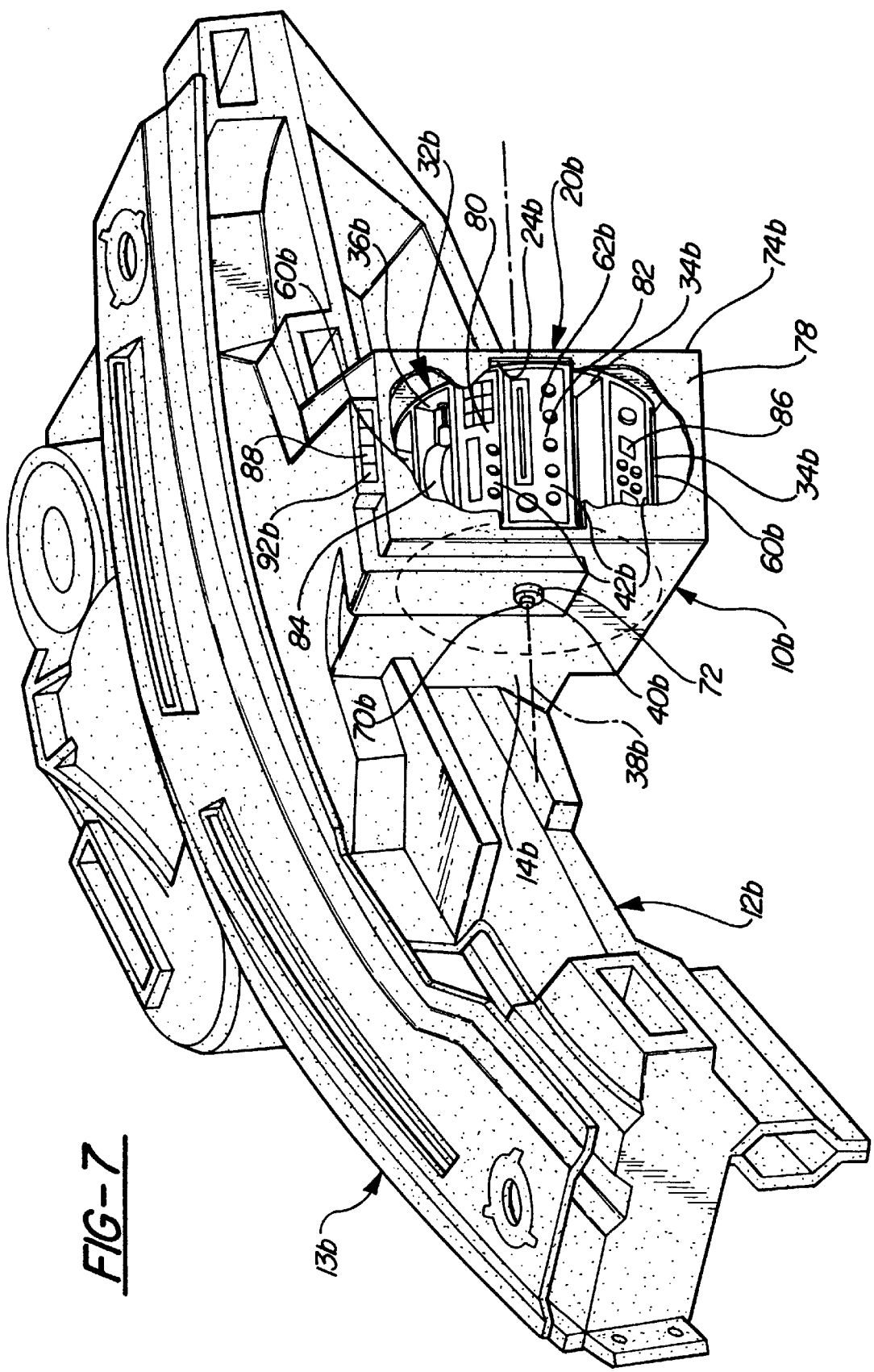
FIG. 7 is a partially cut-away perspective view of an instrument panel assembly constructed according to a third embodiment of the present invention.

The third embodiment of the vehicle passenger compartment console assembly is shown at 10b in FIG. 7. According to the third embodiment the positioning apparatus 32b comprises a drum-type carrousel 36b supported "Ferris-wheel" style in the instrument panel console body 12b for rotation about a generally horizontal axis 38b. The carrousel axis 38b is disposed transverse to the vehicle direction of travel to more conveniently present the contents of the storage modules 34b to vehicle occupants. The display position is located at the aft-most portion of the carrousel 36b where the contents of a storage module 34b are visible and/or physically accessible through an access opening 20b defined by a small rectangular window in a front panel 78 covering the center stack opening. The storage modules 34b of the drum-type carrousel 36 include a radio receiver 80, a CD player 82, a cell phone 84, HVAC controls 86, and open compartments for storage 34b. Other embodiments may include any number of other such components. All of the components in the storage modules 34b are selectively movable to the display position adjacent the access opening 20b through occupant actuation of a selector switch 88 mounted on the console above the rectangular opening in the central stack portion 74.

Actuation may alternatively be accomplished by any other suitable means known in the art. In addition, such actuation means may be mounted on any convenient surface within the vehicle passenger compartment.

The fourth embodiment includes a "lazy Susan-type positioning apparatus 32c that includes a platform 90 having any number of generally pie-shaped storage regions 34c. The platform 90 is rotatably supported within the console body outer shell 14c. The positioning apparatus 32c is configured to rotate the platform 90 and move a selected one of the storage regions 34c to a display position adjacent the access opening 20c while simultaneously moving the other of the storage regions 34c into a remote position displaced from the access opening 20c. This allows a passenger compartment occupant to gain physical access to an item stored on one of the storage regions 34c of the platform 90 through the access opening 20c while leaving other items stored on the other storage regions in positions within the shell 14 that are remote from the access opening 20c.

As with the other embodiments, the positioning apparatus 32c includes an electro-mechanical occupant-actuated drive mechanism 40c and an occupant-actuated automatic module selection system 92c. Similar to the first embodiment, the fourth embodiment includes an access door 44c that is slidably supported across the module access opening 20. The door 44c is shaped to cover the access opening 20 when moved to a closed position and uncovers the access opening 20c when moved to an open position as shown in FIG. 8.

As with previously described embodiments, the storage spaces 34c on the lazy-Suzan type platform 90 of the fourth embodiment are adapted to permanently or semi-permanently accommodate various appliances or to temporarily store various loose items.

Unlike the previously described embodiments, the positioning apparatus 32c of the fourth embodiment includes no divider panels 64, no cap panel 66 and only a single axle rod (not shown) extending axially downward from the base panel 68.

This is an illustrative description of the invention using descriptive rather than limiting words. Obviously, it's possible to modify this invention in light of the above teachings. Within the scope of the claims, one may practice the invention other than as described.

We claim:

1. A vehicle passenger compartment console assembly comprising:
    a console body having an outer shell;
    an access opening disposed in the console body outer shell;
    a positioning apparatus movably supported within the console body outer shell;
    at least one storage module and a generally flat face panel disposed within the shell and movably supported on the positioning apparatus; the at least one storage module and the generally flat face panel sequentially movable between one or more concealed positions displaced from the access opening and a displayed position adjacent the access opening; the generally flat face panel closing off the access opening when the generally flat face panel is in the displayed position thereby concealing the at least one storage module from view.

2. The vehicle passenger compartment console assembly as defined in claim 1 in which the at least one storage module is sequentially moveable through the displayed position.

3. The vehicle passenger compartment console assembly as defined in claim 1 in which the positioning apparatus comprises a carrousel supported for rotation about a carrousel axis.

4. The vehicle passenger compartment console assembly as defined in claim 1 in which of at least one storage module comprises an appliance that is incorporated into the design of the module.

5. The vehicle passenger compartment console assembly as defined in claim 1 in which said at least one storage module comprises a storage space.

6. The vehicle passenger compartment console assembly as defined in claim 1 in which the console body is an instrument panel console body supported in an instrument panel assembly of the automobile.

7. The vehicle passenger compartment console assembly as defined in claim 6 in which the positioning apparatus comprises a drum-type carrousel supported in the instrument panel console body for rotation about a generally vertical axis.

8. The vehicle passenger compartment console assembly as defined in claim 3 in which the carrousel is at least partially housed within a central stack portion of the instrument panel assembly.

9. The vehicle passenger compartment console assembly as defined in claim 1 in which the positioning apparatus comprises an electro-mechanical occupant-actuated drive mechanism.

10. The vehicle passenger compartment console assembly as defined in claim 9 in which the positioning apparatus comprises an occupant-actuated automatic module selection system.

* * * * *